Patented July 26, 1938

2,125,026

UNITED STATES PATENT OFFICE 2,125,026

PROCESS FOR THE MANUFACTURE OF ALKALI METAL BERYLLIUM FLUORIDES

Gustav Jaeger, Neu-Isenburg, Germany, assignor to Deutsche Gold und Silber Scheideanstalt vormals Roessler, Frankfort-on-the-Main, Germany, a corporation of Germany No Drawing. Application June 10, 1937, Serial No. 147,562. In Germany June 20, 1936

7 Claims. (Cl. 23—88)

My invention relates to a process for manufacturing alkali metal beryllium fluorides that is the double salts of the general formulas $Me_2BeF_4$ and $MeBeF_3$ or mixtures thereof. By Me is meant any alkali metal generally.

According to a known process alkali metal beryllium fluorides are prepared by dissolving beryllium oxide in hydrofluoric acid, adding the calculated quantity of alkali metal fluoride to the solution of beryllium fluoride in water and taking the whole to dryness. This process has the great disadvantage amongst others that the solution containing hydrofluoric acid strongly attacks the vessels wherein the preparation is effected.

In accordance to another known process minerals containing beryllium are opened up by heating them with sodium bifluoride or other fluorine compounds containing or splitting off the HF group, to high temperatures such as for instance 550 to 800° C., leaching the product thus obtained with water and evaporating the previously purified solutions whereby sodium beryllium fluoride is obtained. This process has the disadvantage that the leaching of the treated material requires large quantities of water since the complex fluoride compounds are soluble with difficulty only, the solutions have to be freed from impurities and since the evaporation of large quantities of water requires a considerable amount of heat.

The present invention allows the conversion of beryllium oxide into alkali metal beryllium fluorides at comparatively very low temperatures such as for instance 100 to 300° C. whereby water soluble products are obtained immediately by a dry process. According to the invention a mixture of beryllium oxide or beryllium hydroxide is heated with acid alkali metal fluoride to reaction temperature. The mixture to be converted is applied advantageously in a state of very fine comminution. Already at temperatures of about 100 to 200° the conversion takes place with formation of alkali metal beryllium fluoride. On increasing the temperature to above 200° the reaction proceeds considerably quicker. I have found it advantageous to heat the mixture to fusion. The conversion is effected with an ease and speed which is the greater the more reactive is the beryllium oxide used. In consequence for carrying through the process I use a beryllium oxide which is very reactive for instance such a one which has not been submitted during its preparation to a too high and too prolonged a heating process.

The conversion reaction is favourably carried through in a closed vessel occasionally blowing off the steam which is formed during the reaction.

According to a way of carrying out my invention to the mixture of beryllium oxide and acid alkali metal fluoride neutral or acid ammonium fluoride is added advantageously in small quantities. The acid ammonium fluoride may for instance be added in quantities which are about 5–10% of the total amount of the reaction mixture. Such mixtures are suitable with special advantage when the reaction is effected in open vessels.

The preparation of alkali metal beryllium fluoride of the formula $MeBeF_3$ is effected advantageously by adding to the beryllium oxide-alkali metal fluoride mixture ammonium fluoride in such a quantity that for each molecule of beryllium oxide a little more than one molecule of neutral ammonium fluoride or half a molecule of ammonium fluoride respectively is added.

*Example 1.*—100 parts (by weight) of finely ground beryllium oxide are heated with 520 parts (by weight) of acid sodium fluoride in a closed lead lined vessel to 200° C. About every 10 minutes the steam formed is blown off through suitable valves. The reaction is complete after one to two hours. This can be seen by the reaction product being completely soluble in water.

*Example 2.*—43 parts (by weight) of beryllium hydroxide are mixed thoroughly with 156 parts (by weight) of acid potassium fluoride. To the mixture 12 parts (by weight) of acid ammonium fluoride are added. The mixture is heated to fusion in an open pan consisting of heat resisting chromium nickel steel alloy. The excess of acid ammonium fluoride is distilled off and can be recovered if desired by well known means. The product obtained corresponds substantially to the formula $K_2BeF_4$.

*Example 3.*—50 parts (by weight) of beryllium oxide are mixed with 124 parts of acid sodium fluoride and 37 parts (by weight) of ammonium fluoride. The mixture is heated to about 250 to 270° until the liberation of ammonia ceases. The resulting product corresponds substantially to the formula $NaBeF_3$.

The process of my invention offers the advantage that the reaction can be effected in a simple and easy manner at comparatively very low temperatures whereby water soluble reaction products are obtained immediately and by a dry process. When sufficiently pure starting materials are used the alkali metal beryllium fluoride is obtained in so pure a state that it can be used immediately for instance for the preparation of beryllium metal by electrolysis without having been subjected to any special purification process.

What I claim is:

1. A process for the direct and dry manufacture of completely water-soluble alkali metal beryllium fluorides which comprises heating a mixture of a material selected from the group consisting of beryllium oxide and beryllium hydroxide with an acid alkali metal fluoride to temperatures ranging from 100° C. to 300° C.

2. A process for the direct and dry manufacture of completely water-soluble alkali metal beryllium fluorides which comprises heating a mixture of a finely divided material selected from the group consisting of beryllium oxide and beryllium hydroxide with an acid alkali metal fluoride to temperatures ranging from 100° C. to 300° C.

3. A process for the direct and dry manufacture of completely water-soluble alkali metal beryllium fluorides which comprises heating a mixture of a material selected from the group consisting of beryllium oxide and beryllium hydroxide with an acid alkali metal fluoride to temperatures ranging from 100° C. to 300° C. in a closed vessel.

4. A process for the direct and dry manufacture of completely water-soluble alkali metal beryllium fluorides which comprises heating a mixture of a material selected from the group consisting of beryllium oxide and beryllium hydroxide with an acid alkali metal fluoride and ammonium fluoride to temperatures ranging from 100° C. to 300° C.

5. A process for the direct and dry manufacture of completely water-soluble alkali metal beryllium fluorides which comprises heating a mixture of a material selected from the group consisting of beryllium oxide and beryllium hydroxide with an acid alkali metal fluoride and acid ammonium fluoride to temperatures ranging from 100° C. to 300° C.

6. A process for the direct and dry manufacture of completely water-soluble alkali metal beryllium fluorides which comprises heating a mixture of a material selected from the group consisting of beryllium oxide and beryllium hydroxide with an acid alkali metal fluoride and 5% to 10% by weight of the total mixture of ammonium fluoride to temperatures ranging from 100° C. to 300° C.

7. A process for the direct and dry manufacture of completely water-soluble alkali metal beryllium fluorides which comprises heating a mixture of a material selected from the group consisting of beryllium oxide and beryllium hydroxide with an acid alkali metal fluoride and 5% to 10% by weight of the total mixture of acid ammonium fluoride to temperatures ranging from 100° C. to 300° C.

GUSTAV JAEGER.